(No Model.) 2 Sheets—Sheet 2.
W. R. WEMPLE.
SELF CLOSING HATCHWAY.
No. 516,037. Patented Mar. 6, 1894.
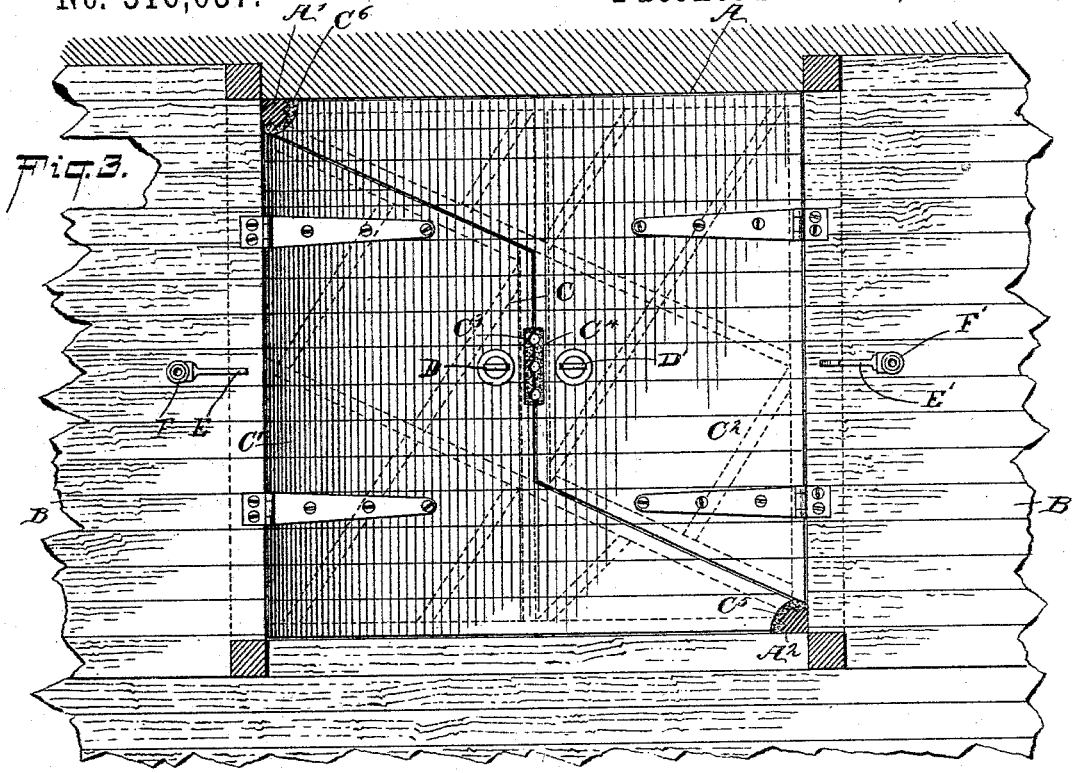
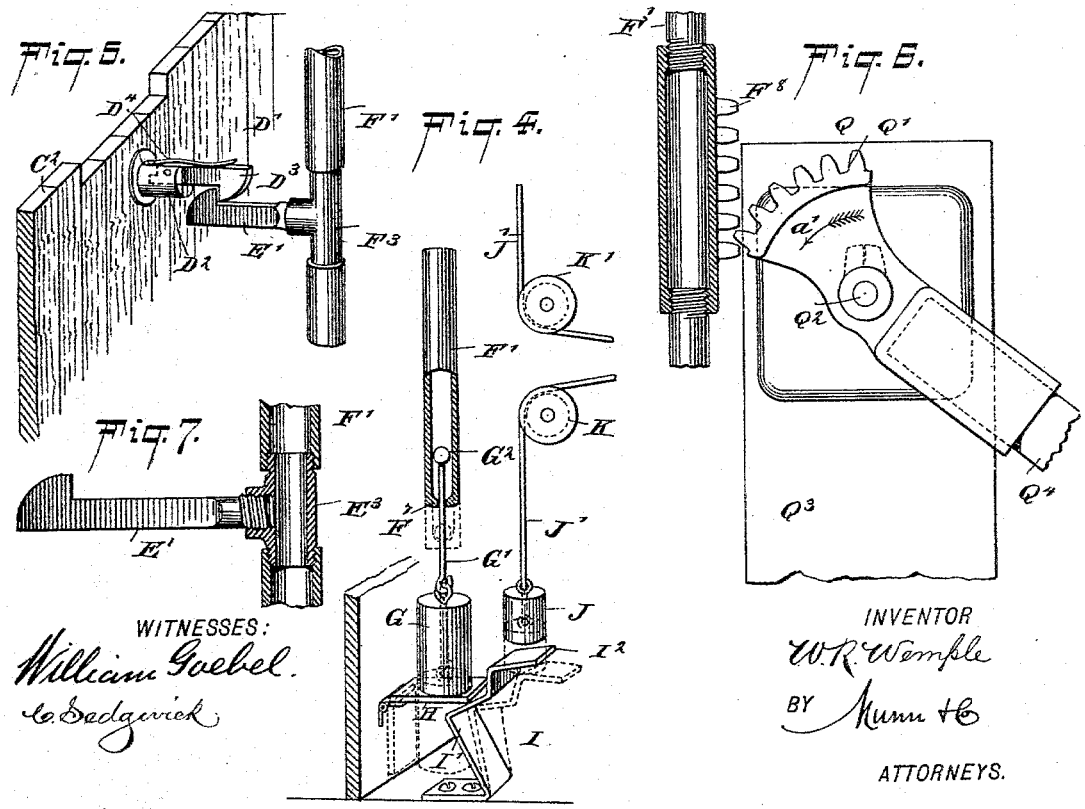
WITNESSES:
William Goebel.
C. Sedgwick.
INVENTOR
W. R. Wemple
BY Munn & Co
ATTORNEYS.

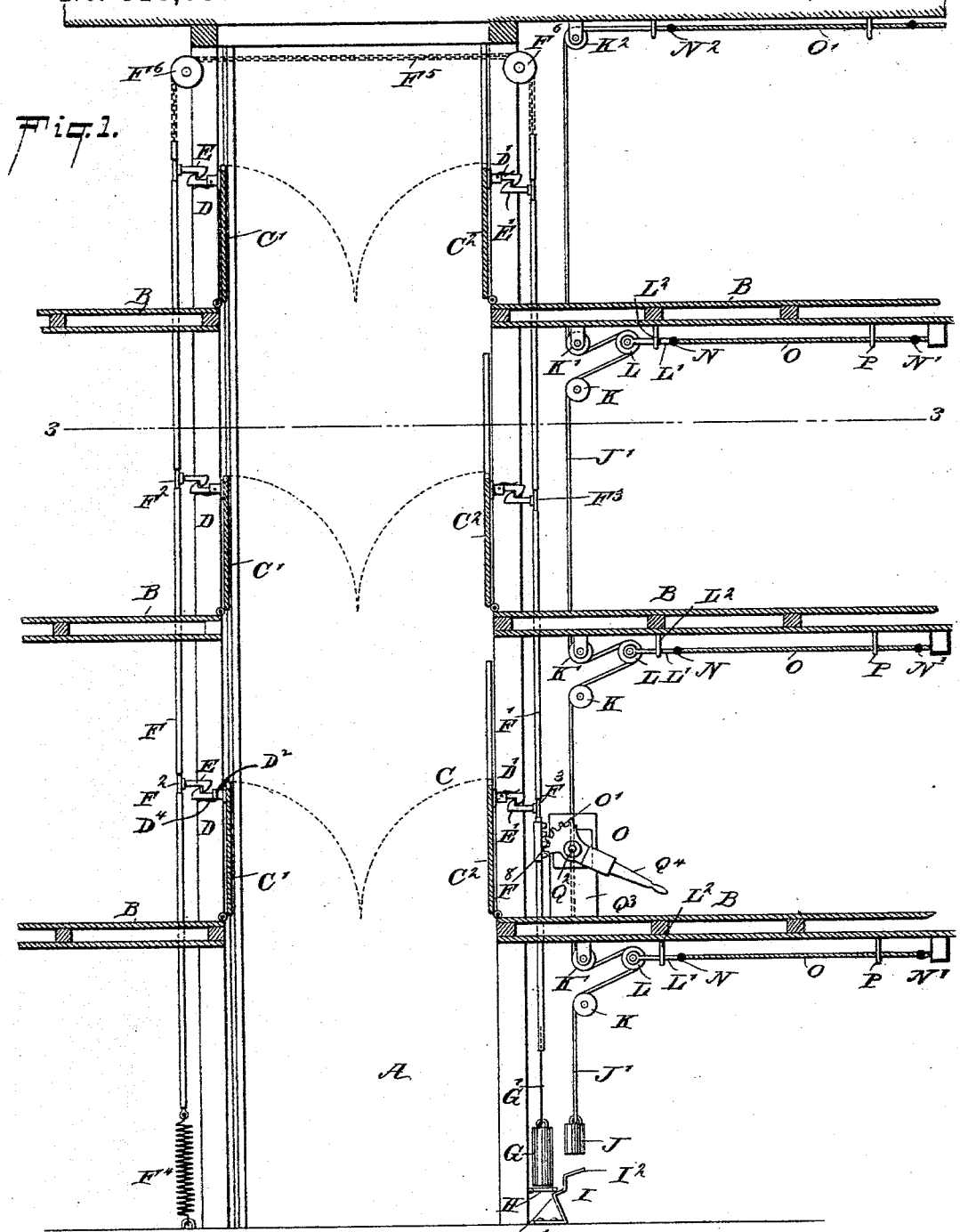

UNITED STATES PATENT OFFICE.

WILLIAM R. WEMPLE, OF NEW YORK, N. Y., ASSIGNOR TO THE AUTOMATIC HATCH DOOR COMPANY, OF SAME PLACE.

SELF-CLOSING HATCHWAY.

SPECIFICATION forming part of Letters Patent No. 516,037, dated March 6, 1894.

Application filed November 22, 1893. Serial No. 491,679. (No model.)

*To all whom it may concern:*

Be it known that I, WILLIAM R. WEMPLE, of the city, county, and State of New York, have invented a new and Improved Self-Closing Hatchway, of which the following is a full, clear, and exact description.

The invention relates to self-closing hatchways such for instance, as are shown and described in Letters Patent of the United States No. 404,618, granted to F. J. Gridley under date of June 4, 1889.

The object of the invention is to provide a new and improved self-closing hatchway, which is simple and durable in construction, very effective in operation and arranged to automatically and positively close the hatchway in case of a fire in the building.

The invention consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1 is a sectional side elevation of the improvement. Fig. 2 is an enlarged sectional side elevation of part of the trap door latch. Fig. 3 is a sectional plan view of the improvement on the line 3—3 of Fig. 1. Fig. 4 is an enlarged perspective view, with parts in section, of the trap door releasing device. Fig. 5 is an enlarged perspective view of the trap door latch, as applied. Fig. 6 is an enlarged side elevation, with part in section, of the mechanism for closing the trap doors by hand; and Fig. 7 is an enlarged side elevation of the trap door latch, with part in section.

The improved self-closing hatchway is provided with the usual elevator shaft A to which lead the several floors B of the building, as plainly shown in Fig. 1. The elevator shaft A is adapted to be closed on each floor by a trap door C made of two sections $C'$ and $C^2$ hinged at opposite sides of the shaft A to the corresponding floor B. The two sections $C'$ and $C^2$ of each trap door are held normally in a vertical position as plainly illustrated in Fig. 1, to permit free passage of the elevator carriage in the usual manner. When, however, it is desired to close the elevator shaft during the night, when the elevator carriage is not running or in case of a fire in the building, then the trap doors are moved into a horizontal position as illustrated in Fig. 3, so that the free edges of the sections $C'$ and $C^2$ meet each other to form a joint made in a zigzag line extending diagonally from one shaft rail $A'$ to the other shaft rail $A^2$, as will be readily understood by reference to Fig. 3. The joint formed by the two sections $C'$ and $C^2$ at the middle of the trap door is lined by packing strips $C^3$ and $C^4$ of asbestus or other fire-proof material, the said strips forming apertures for the passage of the elevator carriage ropes. Similar packing strips $C^5$ and $C^6$ are arranged on the sections $C'$ and $C^2$ at the corners next to the shaft rails $A'$ and $A^2$, so as to snugly fit thereon to prevent draft at this place, and consequently prevent spreading of flames through the elevator shaft from one floor to another.

On the sections $C'$ and $C^2$ of each trap door C are arranged the latches D and $D'$ respectively, alike in construction and each provided with a bracket $D^2$ secured to the top of the respective section as plainly illustrated in Figs. 1, 2 and 5. In each bracket $D^2$ is pivoted the latch $D^3$ proper held normally in a horizontal position when the trap door is open by a spring $D^4$ attached to the bracket and pressing on the back of the latch. The latches D and $D'$ are adapted to engage latch pins E and $E'$ respectively, secured on nipples $F^2$ and $F^3$ respectively, forming part of the rods or tubes F and $F'$ respectively, extending vertically through the several floors on opposite sides of the shaft A, as plainly illustrated in Fig. 1. The lower end of the rod or tube F is connected with a spring $F^4$ attached to the ground floor of the building and the upper end of the said rod or tube is connected by a chain or rope $F^5$ with the upper end of the other rod or tube $F'$ near the roof of the building, the said chain $F^5$ passing over guide pulleys $F^6$ journaled in the opposite walls of the shaft A near the upper end of the same. The lower end of the rod or tube $F'$ is connected with a weight G provided with a rod $G'$ extending through the contracted lower end $F^7$ of the tube $F'$, and carrying inside of the latter a ball G² which permits a free sliding of the tube F' when it is desired to close the trap doors by hand as hereinafter more fully described; the said ball being also adapted to engage the contracted end F⁷ of the tube to exert a downward pressure on the tube at the time the support H for the weight G is removed. This support H consists of a plate hinged to the side wall of the shaft A near the ground floor, and the plate is held normally in a horizontal position by a spring catch I fastened to the floor and provided with a shoulder I' engaging the free end of the said support H, as will be readily understood by reference to Figs. 1 and 4. In order to automatically trip this catch I, I provide the upper end of the same with an extension I², above which is suspended a weight J held on the lower end of a tripping rope J' extending upwardly and passing over and under sets of pulleys K and K' respectively, arranged in the different stories of the building below the ceilings thereof, as indicated in Fig. 1. The rope J' also passes over a pulley L between the two pulleys K and K' in each story, and each of these pulleys L is journaled on a short rod L' mounted to slide in a suitable bearing L² secured to the ceiling of the respective story as plainly shown in Fig. 1. The inner end of each rod L' has a fusible connection N with a rod or rope O made in sections united by fusible connections N' and extending through the corresponding story of the building, the end of each rope being rigidly connected to a suitable device in the building. The rod or rope O is guided and supported in eyes P screwed or otherwise attached to the ceiling of the respective story as indicated in Fig. 1. The upper part of the rope J' in the top story of the building passes over a pulley K² arranged on the ceiling, and the extreme end of this rope has a fusible connection N² with a rod or rope O' similar to the rods or ropes O and arranged along the ceiling of the uppermost story.

The operation is as follows: When the several parts are in position, as illustrated in Fig. 1, then the sections C' and C² of each trap door are locked in a vertical position by the respective latches D and D', and latch pins E and E', so as to permit a free passage of the elevator carriage in the shaft A. Now in case a fire breaks out in the building and the fusible connection N or N' in any of the ropes is melted by the heat emanating from the fire, then the said rope releases the rod L' and the pulley L, whereby the weight J descends and engages the extension I² of the spring catch I to bend the latter outward, so as to disengage its shoulder I' from under the free end of the hinged support H. The latter thus swings downward and thereby releases the weight G, which moves downward to finally move the ball G² on its rod G' into contact with the contracted end F⁷ of the tube F', whereby the said weight exerts a downward pull on the tube F' to cause the same to slide downward, at the same time causing an upward movement of the other tube F owing to the chain F⁵ connecting the two rods with each other. By the downward movement of the tube F' its latch pins E' disengage the latches D' on the trap door sections C² and the upward movement of the tube F causes a disengagement of its latch pins E from the latches D on the trap door sections C'. Thus, both sections C' and C² of all the trap doors are simultaneously released and consequently the said sections swing downward by their own weight into a horizontal position, so as to effectively close the shaft A on each floor B. By this arrangement the spread of fire from one floor to another through the shaft A is prevented. When it is desired to close the trap doors C by hand during the night, when the elevator carriage is not in use or at any other time, the following hand mechanism Q is provided: On the tube F' is secured a rack F⁸ in mesh with a segmental gear wheel Q' pivoted at Q² to a bracket Q³ erected on the flooring in one of the floors of the building. A handle Q⁴ extends from the segmental gear wheel Q' and is under the control of the operator so that the latter, by moving the handle Q⁴ upward, imparts a downward swinging motion to the segmental gear wheel Q' in the direction of the arrow a', see Fig. 6, so that a downward sliding of the tube F' and a consequent upward sliding of the tube F takes place as the said segmental gear wheel Q' meshes into the teeth of the rack F⁸. By the downward movement of the tube F' and the upward movement of the tube F their latches are moved outward out of engagement with the latch pins E and E' respectively to permit the trap door sections to close, as previously explained. When the operator moves the hand lever Q⁴ as described, the position of the weight G and its hinged support is not disturbed, as the tube F' has a loose connection with the rod or stem G' of the weight G as above described.

It will be seen that the several working parts are located outside of the shaft A in the different stories of the building and are hence easily accessible for inspection and repairs, and are not liable in case of breakage to form a dangerous obstruction to the elevator carriage.

Having thus fully described my invention, I claim as new and desire to secure by Letters Patent—

1. The combination, with the trap doors and latches on said doors, of a slidable rod or tube and a series of latch pins rigidly fixed to said rod or tube and adapted to engage the latches on the trap doors, substantially as described.

2. The combination, with the trap doors adapted to close the hatchway and latches on said doors, of slidable connected rods or tubes arranged on opposite sides of the hatchway, and a series of latch pins rigidly secured to the said rods or tubes and adapted to engage the said latches, substantially as described.

3. The combination, with the trap doors and latches on said doors, of a slidable rod or tube, a series of latch pins rigidly secured to said rod or tube and adapted to engage the latches on the trap doors, and a supported weight having a loose connection with the said rod or tube, substantially as described.

4. The combination, with the trap doors and latches on said doors, of a slidable rod or tube, a series of latch pins rigidly secured to said rod or tube and adapted to engage the latches on the trap doors, and a hand mechanism for imparting a sliding motion to the said rod or tube, as set forth.

5. The combination, with the trap doors adapted to close the hatchway, and latches on said doors, of slidable connected rods or tubes arranged on opposite sides of the hatchway, a series of latch pins rigidly secured to the said rods or tubes and adapted to engage the said latches, and a weight having a loose connection with one of the said rods or tubes, substantially as described.

6. The combination, with the trap doors adapted to close the hatchway, and latches on said doors, of slidable connected rods or tubes arranged on opposite sides of the hatchway, a series of latch pins rigidly secured to the said rods or tubes and adapted to engage the said latches, a weight having a loose connection with one of the said rods or tubes, a movable support for the said weight, and a spring catch adapted to engage the said support to hold it in position, substantially as described.

7. The combination, with the trap doors adapted to close the hatchway, and latches on said doors, of slidable connected rods or tubes arranged on opposite sides of the hatchway, a series of latch pins rigidly secured to the said rods or tubes and adapted to engage the said latches, a weight having a loose connection with one of the said rods or tubes, and a spring connected with the other rod or tube, substantially as described.

8. In a self-closing hatchway, the combination with a sliding rod or tube adapted to lock the hatch doors in their normal position, of a weight having a loose connection with the said tube, a hinged support for the said weight, and a spring catch engaging the free end of the said support, substantially as shown and described.

9. In a self-closing hatchway, the combination with a sliding rod or tube adapted to lock the hatch doors in their normal position, of a weight having a loose connection with the said rod or tube, a hinged support for the said weight, a spring catch engaging the free end of the said support, a tripping rope having a weight adapted to engage the said spring catch, a retaining rope or rod connected with the said tripping rope, and a fusible connection between the said tripping rope and the said retaining rope or rod, substantially as shown and described.

10. In a self-closing hatchway, the combination with a sliding rod or tube adapted to lock the hatch doors in place, of a weight having a sliding connection with the said rod or tube, a movable support for the said weight, a spring catch for holding said support in its normal position a tripping rope having a weight adapted to engage the said spring catch, a retaining rope or rod connected with the said tripping rope, and a fusible connection between the said retaining rope or rod and the said tripping rope, substantially as shown and described.

11. In a self-closing hatchway, the combination with a series of hatchway trap doors provided with latches, of connected sliding tubes carrying rigid latch pins adapted to engage the said latches, a rack secured on one of the said tubes, a segmental gear wheel in mesh with the said rack, and a handle for turning the said gear wheel, substantially as shown and described.

12. In a self-closing hatchway, the combination with a tube adapted to lock the hatchway trap doors in their normal position and provided with a contracted lower end, of a weight, a rod connected with the said weight and extending into the tube through the contracted end, and a ball on the end of the said rod within the said tube, substantially as shown and described.

WILLIAM R. WEMPLE.

Witnesses:
F. G. WHEELER,
H. R. WEMPLE.